(12) United States Patent
Cassaro et al.

(10) Patent No.: US 12,537,732 B2
(45) Date of Patent: Jan. 27, 2026

(54) METHODS, SYSTEMS, AND CIRCUITS FOR DETERMINING CONVERGENT DIGITAL RADIO MODE

(71) Applicant: Skyworks Solutions, Inc., Irvine, CA (US)

(72) Inventors: Thomas Mario Cassaro, Austin, TX (US); Connor William Blasie, Austin, TX (US); Alexander Kleinerman, Austin, TX (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 18/437,112

(22) Filed: Feb. 8, 2024

(65) Prior Publication Data

US 2024/0275659 A1 Aug. 15, 2024

Related U.S. Application Data

(60) Provisional application No. 63/484,695, filed on Feb. 13, 2023, provisional application No. 63/484,682, filed on Feb. 13, 2023.

(51) Int. Cl.
*H04L 27/26* (2006.01)

(52) U.S. Cl.
CPC ...... *H04L 27/2663* (2013.01); *H04L 27/2675* (2013.01)

(58) Field of Classification Search
CPC .......................... H04L 27/2663; H04L 27/2675

USPC ........................................................ 375/343
See application file for complete search history.

(56) References Cited

U.S. PATENT DOCUMENTS

| | | | |
|---|---|---|---|
| 11,140,014 B1 | 10/2021 | Kleinerman | |
| 11,381,267 B1 | 7/2022 | Kleinerman | |
| 11,652,667 B2 | 5/2023 | Kleinerman | |
| 11,757,480 B2 | 9/2023 | Lin | |

FOREIGN PATENT DOCUMENTS

| | | |
|---|---|---|
| KR | 10-2277569 | 7/2021 |
| KR | 102277569 B1 * | 7/2021 |

OTHER PUBLICATIONS

U.S. Appl. No. 18/792,426, filed 2024.*

* cited by examiner

*Primary Examiner* — Kevin M Burd
(74) *Attorney, Agent, or Firm* — Knobbe, Martens, Olson & Bear, LLP

(57) ABSTRACT

Aspects of this disclosure relate to determining a transmission mode and a spectrum mode of a Convergent Digital Radio signal. The Convergent Digital Radio signal can be filtered by a plurality of filters. Correlation coefficients can be generated from the filtered signals, in which each correlation coefficient corresponds to a particular transmission mode and at least one particular spectrum mode. The transmission mode and the spectrum mode can be selected based on the correlation coefficients.

20 Claims, 9 Drawing Sheets

| SPECTRUM MODE INDEX | \-5 | \-4 | \-3 | \-2 | \-1 | 1 | 2 | 3 | 4 | 5 | N |
|---|---|---|---|---|---|---|---|---|---|---|---|
| 1 | DB1 (L) | DB1 (U) | DB2 (L) | DB2 (U) | DB3 (L) | DB3 (U) | DB4 (L) | DB4 (U) | DB5 (L) | DB5 (U) | 1 |
| 2 | 0 | DA1 (L) | DA1 (U) | DA2 (L) | DA2 (U) | DA3 (L) | DA3 (U) | DA4 (L) | DA4 (U) | 0 | 2 |
| 3~8 | | | | | | RESERVED | | | | | |
| 9 | 0 | DA1 (L) | DB1 (U) | DB2 (L) | DB2 (U) | DB3 (L) | DB3 (U) | DB4 (L) | DA4 (U) | 0 | 1 |
| 10 | DB1 (L) | DB1 (U) | DB2 (L) | DB2 (U) | DB3 (L) | DA3 (U) | DB4 (L) | DB5 (U) | DB5 (L) | DB5 (U) | 2 |
| 11~21 | | | | | | RESERVED | | | | | |
| 22 | DB1 (L) | DB1 (U) | DB2 (L) | DB2 (U) | DB3 (L) | DB3 (U) | DB4 (L) | DB4 (U) | DB5 (L) | DB5 (U) | 1 |
| 23 | 0 | DA1 (L) | DA1 (U) | DA2 (L) | DA2 (U) | DA3 (L) | DA3 (U) | DA4 (L) | DA4 (U) | 0 | 2 |
| 24~64 | | | | | | RESERVED | | | | | |

NOTE: L DENOTES THE LOWER HALF-SUB-BAND, AND U DENOTES THE UPPER HALF-SUB-BAND

| PARAMETER | TRANSMISSION MODE 1 | TRANSMISSION MODE 2 | TRANSMISSION MODE 3 |
|---|---|---|---|
| $T_b$ ms | 1.255 (1024T) | 1.627 (512T) | 1.255 (1024T) |
| $N_b$ | 1024 | 512 | 1024 |

FIG.5

| | TRANSMISSION MODE 1 | TRANSMISSION MODE 2 | TRANSMISSION MODE 3 |
|---|---|---|---|
| BEACON CYCLIC PREFIX LENGTH ms | $T_{Bcp} = T_{sf} - T_s \times S_N - T_M$ 0.4706 (384T) | 0.4069 (332T) | 0.2059 (168T) |

| | Spectrum Mode Index | -5 | -4 | -3 | -2 | -1 | 1 | 2 | 3 | 4 | 5 | N |
|---|---|---|---|---|---|---|---|---|---|---|---|---|
| FILTER 1 | 1 | DB1 (L) | DB1 (U) | DB2 (L) | DB2 (U) | D | D | DB4 (L) | DB4 (U) | DB5 (L) | DB5 (U) | 1 |
| FILTER 2 | 2 | 0 | DA1 (L) | DA1 (U) | DA2 (L) | DA2 (U) | DA3 (L) | DA3 (U) | DA4 (L) | DA4 (U) | 0 | 2 |
| | 3~8 | | | | | RESERVED | | | | | | |
| FILTER 3 | 9 | 0 | D | DA1 (L) | DA2 (L) | DA2 (U) | DA3 (L) | DA3 (U) | DA4 (L) | D | 0 | 1 |
| FILTER 4 | 10 | D | DB1 (U) | DB2 (L) | DB2 (U) | D | D | DB3 (L) | DB4 (L) | DB5 (L) | D | 2 |
| | 11~21 | | | | | RESERVED | | | | | | |
| FILTER 5 | 22 | DB1 (L) | DB1 (U) | DB2 (L) | DB3 (L) | DB3 (U) | D | DB4 (L) | D | DB5 (L) | DB5 (U) | 1 |
| FILTER 6 | 23 | 0 | D | DA1 (U) | DA2 (L) | DA2 (U) | DA3 (L) | DA3 (U) | DA4 (L) | D | 0 | 2 |

PASSBAND

LOCATION OF FREQUENCY BLOCK

50 KHz

GUARD BAND — PASSBAND

FIG.6

METHODS, SYSTEMS, AND CIRCUITS FOR DETERMINING CONVERGENT DIGITAL RADIO MODE

CROSS REFERENCE TO PRIORITY APPLICATIONS

Any and all applications for which a foreign or domestic priority claim is identified in the Application Data Sheet as filed with the present application are hereby incorporated by reference under 37 C.F.R. § 1.57. This application claims the benefit of priority of U.S. Provisional Application No. 63/484,682, filed Feb. 13, 2023 and titled "METHODS, SYSTEMS, AND CIRCUITS FOR DETERMINING CONVERGENT DIGITAL RADIO MODE," and U.S. Provisional Application No. 63/484,695, filed Feb. 13, 2023 and titled DETERMINING TRANSMISSION MODE AND SPECTRUM MODE FOR CONVERGENT DIGITAL RADIO," the disclosures of each of which are hereby incorporated by reference in their entireties and for all purposes.

BACKGROUND

Technical Field

The disclosed technology relates to digital radio. Embodiments disclosed herein relate to determining spectrum mode and transmission mode of a radio signal.

Description of Related Technology

Digital radio technology involves transmitting digital signals in the radio spectrum. Digital radio signal use digital encoding. In digital broadcasting systems, analog signals can be digitized and transmitted using a digital modulation scheme. Receiving devices can receive and process a digital radio signal.

Convergent Digital Radio (CDR) is a digital radio broadcasting standard that can operate in a frequency modulation (FM) band from 87 megahertz (MHz) to 108 MHz. CDR has been referred to as China Digital Radio. CDR is a FM In-Band On-Channel (FM IBOC) technology.

CDR has a plurality of spectrum modes and a plurality of transmission modes for transmission CDR signals. A CDR signal is transmitted using a particular spectrum mode and a particular transmission mode.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

One aspect of this disclosure is a radio system for determining transmission mode and spectrum mode of Convergent Digital Radio. The radio system includes one or more antennas, a receive signal path operatively connected to the one or more antennas, and digital signal processing circuitry in communication with the receive signal path. The digital signal processing circuitry is configured to implement a plurality of filters each having a passband corresponding to at least one spectrum mode, a group of correlators each configured to generate a correlation coefficient for a particular transmission mode and at least one particular spectrum mode, and a selection circuit configured to select a transmission mode and a spectrum mode of a Convergent Digital Radio signal received by the one or more antennas based on the correlation coefficients from the group of correlators.

The digital signal processing circuitry can be arranged to configure the radio system to receive the Convergent Digital Radio signal in the transmission mode and the spectrum mode based on selecting the transmission mode and the spectrum mode.

The selection circuit can be configured to determine a maximum correlation coefficient having a maximum value of the correlation coefficients from the group of correlators. The maximum correlation coefficient can correspond to the transmission mode. The selection circuit can be configured to generate a binary vector of correlation coefficients for the transmission mode, to and map the binary vector to the spectrum mode.

The digital signal processing circuitry can select the transmission mode and the spectrum mode from time domain Orthogonal Frequency Division Multiplexing symbols using time domain processing.

The plurality of filters can include includes at least 5 filters. Three correlators from the group of correlators can be connected to an output of each filter of the plurality of filters. At least one of the correlation coefficients can corresponds to two spectrum modes. The plurality of filters can include at least 3 filters having respective passbands that correspond to frequencies of Orthogonal Frequency Division Multiplexing symbols for a plurality of spectrum modes.

The group of correlators can generate at least 15 correlation coefficients. The group of correlators can generate 18 correlation coefficients.

The radio system can include a speaker in communication with the digital signal processing circuitry. The digital signal processing circuitry can be implemented by a digital signal processor. The radio system can be configured for a vehicle.

Another aspect of this disclosure is digital signal processing circuitry. The digital signal processing circuitry includes a plurality of filters each having a passband corresponding to at least one spectrum mode, a group of correlators each configured to generate a correlation coefficient for a particular transmission mode and at least one particular spectrum mode; and a selection circuit configured to select a transmission mode and a spectrum mode of a Convergent Digital Radio signal based on the correlation coefficients from the group of correlators.

The digital signal processing circuitry can include one or more suitable features of the digital signal processing circuitry disclosed herein.

Another aspect of this disclosure is a method of determining spectrum mode and transmission mode for Convergent Digital Radio. The method includes filtering a Convergent Digital Radio signal to generate a plurality of filtered signals; generating a group of correlation coefficients from the plurality of filtered signals, each correlation coefficient of the group of correlation coefficients corresponding to a particular transmission mode and at least one particular spectrum, mode; and selecting a transmission mode and a spectrum mode of the Convergent Digital Radio signal based on the group of correlation coefficients.

The method can include configuring a radio system to receive a Convergent Digital Radio transmission in the transmission mode and the spectrum mode.

The selecting the transmission mode can include determining a maximum correlation coefficient having a maximum value of the correlation coefficients of the group, and the maximum correlation coefficient can correspond to the transmission mode. The selecting the spectrum mode can include generating a binary vector of correlation coefficients for the transmission mode and mapping the binary vector to the spectrum mode. The mapping can be based on a set of the filtered signals having frequencies corresponding to Orthogonal Frequency Division Multiplexing symbols in the spectrum mode.

The group of correlation coefficients can include at least 15 correlation coefficients.

The filtering can be performed with at least 5 independent filters. The generating the group of correlation coefficients can be performed with at least 15 correlators.

The method can be performed on a beacon. The beacon can include a cyclic prefix, a first synchronization sequence, and a second synchronization sequence that is identical to the first synchronization sequence.

The method can be performed on a time domain Orthogonal Frequency Division Multiplexing sequence of the Convergent Digital Radio signal. The filtering, the generating, and the selecting can be performed in a time domain.

Another aspect of this disclosure is a method of determining spectrum mode and transmission mode for Convergent Digital Radio. The method includes obtaining a plurality of correlation coefficients associated with a Convergent Digital Radio signal, each correlation coefficient of the plurality of correlation coefficients corresponding to a particular transmission mode and at least one particular spectrum mode; selecting a transmission mode based on a maximum correlation coefficient having a maximum value of the plurality of correlation coefficients; generating a binary vector of correlation coefficients for the transmission mode; and selecting a spectrum mode by mapping the binary vector to the spectrum mode.

The method can include configuring a radio system to receive a Convergent Digital Radio transmission in the transmission mode and the spectrum mode.

The plurality of correlation coefficients can include at least 15 correlation coefficients.

Generating the binary vector can include comparing the correlation coefficients for the transmission mode to a threshold.

The plurality of correlation coefficients can be associated with a beacon. The beacon can include a cyclic prefix, a first synchronization sequence, and a second synchronization sequence that is identical to the first synchronization sequence.

The plurality of correlation coefficients can be generated from a time domain Orthogonal Frequency Division Multiplexing sequence.

The method can include generating the plurality of correlation coefficients.

The method can be performed by a radio system of a vehicle.

Another aspect of this disclosure is a radio system for determining transmission mode and spectrum mode of Convergent Digital Radio. The radio system includes one or more antennas; a receive signal path operatively connected to the one or more antennas; and digital signal processing circuitry in communication with the receive signal path, the digital signal processing circuitry including a selection circuit configured to obtain a plurality of correlation coefficients associated with a Convergent Digital Radio signal, select a transmission mode based on a maximum correlation coefficient having a maximum value of the plurality of correlation coefficients, generate a binary vector of correlation coefficients for the transmission mode, and select the spectrum mode by mapping the binary vector to the spectrum mode.

The digital signal processing circuitry can be arranged to configure the radio system to receive the Convergent Digital Radio signal in the transmission mode and the spectrum mode.

The plurality of correlation coefficients can include 18 correlation coefficients each corresponding to a combination of a particular spectrum mode and a particular transmission mode.

The digital signal processing circuitry can be arranged to generate the plurality of correlation coefficients, and each correlation coefficient of the plurality of correlation coefficients can correspond to at least one particular spectrum mode and a particular transmission mode.

The digital signal processing circuitry can be configured to generate the binary vector by at least comparing the correlation coefficients for the transmission mode to a threshold.

The plurality of correlation coefficients can be associated with a beacon.

The radio system can include a speaker in communication with the digital signal processing circuitry.

The digital signal processing circuitry can be implemented by a digital signal processor.

The radio system can be configured for a vehicle.

The receive signal path can include a low noise amplifier, a mixer, and an analog-to-digital converter.

Another aspect of this disclosure is a method of determining of a Convergent Digital Radio spectrum mode. The method includes generating a binary vector with associated with a Convergent Digital Radio signal, values of the binary vector being associated with different passbands; and selecting a spectrum mode of the Convergent Digital Radio signal by mapping the binary vector to the spectrum mode.

The method can include determining a transmission mode of the Convergent Digital Radio signal. The binary vector can be associated with the transmission mode.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

FIG. 2 is a table of Convergent Digital Radio (CDR) spectrum modes.

FIG. 4 is a table of beacon parameters for different transmission modes.

FIG. 5 is a table of beacon cyclic prefix lengths for different transmission modes.

FIG. 6 is a table of CDR spectrum modes with filter passband and guard bands for the filters of FIG. 1 according to an embodiment.

DETAILED DESCRIPTION OF CERTAIN EMBODIMENTS

Figure 1:
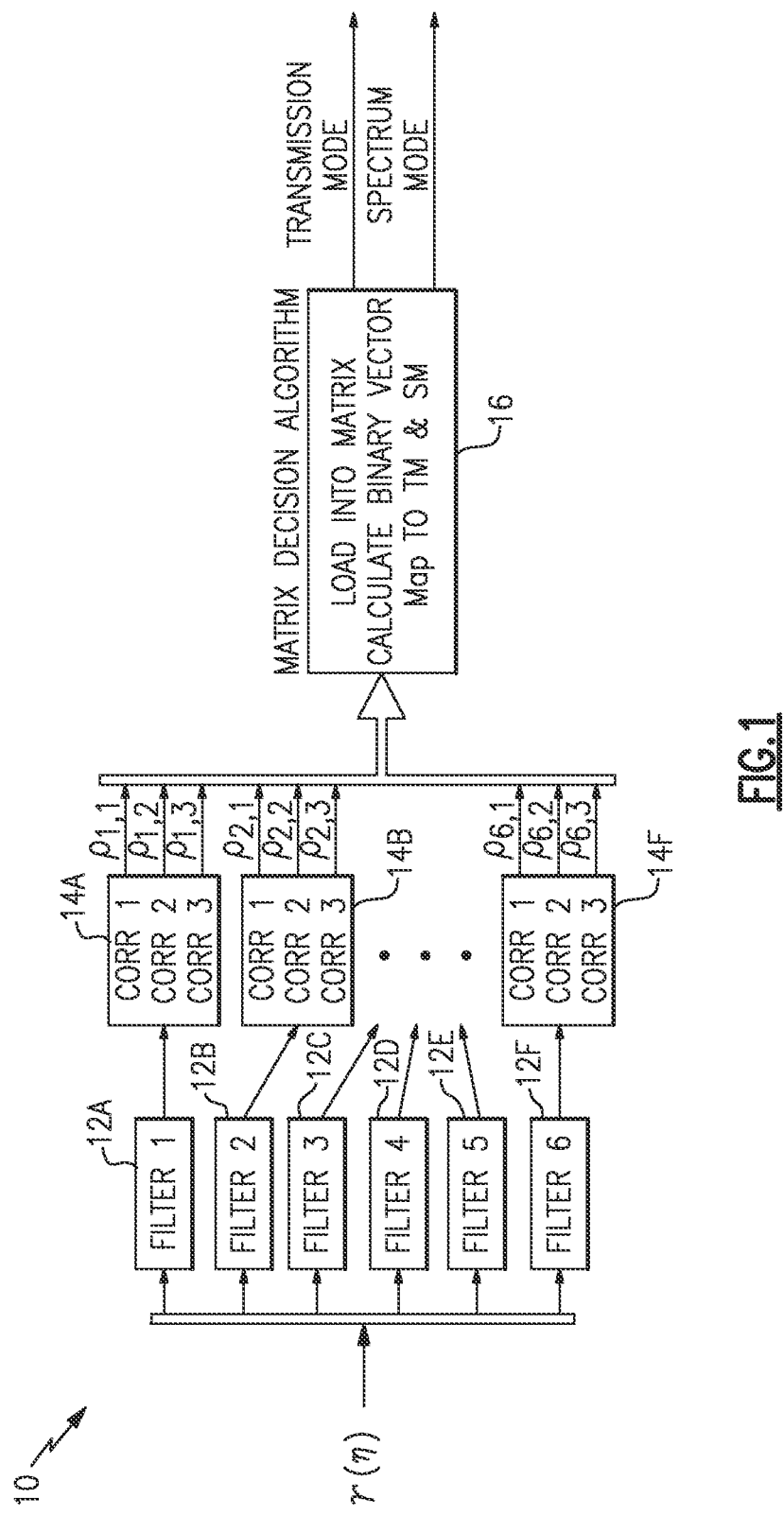
FIG. 1 is a schematic diagram of blocks for determining a transmission mode and a spectrum mode according to an embodiment.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

This disclosure provides a robust algorithm that can jointly estimate the spectrum mode (SM) and transmission mode (TM) of a transmitter employing coded orthogonal frequency division multiplexing (OFDM) for a Convergent Digital Radio (CDR) standard. A current CDR specification supports 6 SMs and 3 TMs for each SM. Accordingly, there are 18 possible transmitter configurations of TM and SM. This disclosure provides a technical solution to determining TM and SM that can be performed in the time domain. A CDR signal can be filtered by separate filters each having a passband corresponding to at least one SM. For example, there can be 6 filters for 6 SMs. Each of these filters can provide an output signal to a respective set of correlators that includes a separate correlator for each TM. For example, for 6 SMs and 3 TMs, there can be 6 sets of 3 correlators connected to filter outputs in certain applications. Each of these correlators can generate a correlation coefficient for a particular SM and a particular TM. The correlators can provide a correlation coefficient for the beacon preamble and cyclic prefix (CP) of OFDM data symbols for each possible configuration of SM and TM. A matrix-based decision algorithm is disclosed that can partition correlator outputs to determine the most probable transmitter configuration of SM and TM. This can deliver faster SM and TM detection results than current solutions. A radio system can be configured for receiving a CDR signal based on the selected SM and TM.

In certain environments such as an urban environment, many frequency modulation (FM) band terrestrial digital broadcasting stations can co-exist, where each is allocated a unique band and may have differing transmitter configurations in terms of SM and TM. To meet consumer specifications, the receiver can be agile and can robustly determine the desired transmitter's configuration over low signal-to-noise ratio (SNR) and multipath fading channels given the received sequence. Providing a robust joint estimate of the SM and TM over such harsh channels such that mobile receivers can independently acquire the desired broadcasting station or switch to another with minimal or little delay is desired.

There appear to be no algorithms regarding the joint estimation of SM and TM in the literature. In the CDR specification, the SM identifier (ID) is transmitted in the data stream and the expectation is that the receiver can decode the data and obtain the value of the SM ID. This, however, could involve 18 independent receivers and would be considerably more complex than embodiments disclosed herein.

Aspects of this disclosure relate to generating correlation coefficients associated with CDR transmitter configurations and selecting the SM and TM combination with the highest probability. In certain applications, correlation coefficients can be generated for each possible CDR transmitter configuration, For example, with 3 TMs and 6 SMs, 18 correlation coefficients can be generated for the 18 combinations of TM and SM. A matrix-based decision algorithm can estimate the highest probability configuration of SM and TM combination based on the correlation coefficients. The SM and TM can be determined from a beacon. In embodiments disclosed herein, SM and TM can be determined without determining the SM ID from a data stream or otherwise using a CDR data stream.

FIG. 1 is a schematic block diagram of processing circuitry 10 for determining a transmission mode and a spectrum mode according to an embodiment. The processing circuitry 10 includes a plurality of filters 12A to 12F, a set of correlators 14A to 14F corresponding to each of the filters 12A to 12F, respectively, and a selection circuit 16 configured to determine a transmission mode and a spectrum mode. The processing circuitry 10 is configured to process a CDR signal r(n). The CDR signal r(n) can include a baseband OFDM sequence in the time domain. The processing circuitry 10 can be any suitable digital signal processing circuitry. For example, a digital signal processor (DSP) can implement the processing circuitry 10 of FIG. 1. The processing circuitry 10 can be baseband processing circuitry. The processing circuitry 10 can be programmed to implement the functionality of the filters 12A to 12F, the sets of correlators 14A to 14F, and the selection circuit 16.

Each of the filters 12A to 12F has a passband corresponding to a different spectrum mode. There is one filter for each spectrum mode in the processing circuitry 10 shown in FIG. 1. For CDR with 6 spectrum modes, there can be 6 filters, for example, as illustrated in FIG. 1. The filters 12A to 12F are arranged to pass data within a passband and filter out frequency content outside of the passband. The filters 12A to 12F can be any suitable filters. For example, the filters 12A to 12F can include finite impulse response (FIR) filter(s) and/or infinite impulse response (IIR) filter(s).

Each set of correlators 14A to 14F can generate correlation coefficients for a particular spectrum mode and each transmission mode. For example, each correlator of a first set of correlators 14A can generate a correlation coefficient for a different transmission mode and the first spectrum mode based on an output signal from the first filter 12A for the first spectrum mode. With 3 transmission modes, each set of correlators 14A to 14F can include 3 correlators. With the filters 12A to 12F and the correlators 14A to 14F of FIG. 1, a correlation coefficient can be generated for each combination of spectrum mode and transmission mode. For CDR with 3 transmission modes and 6 spectrum modes, 18 correlation coefficients can be generated.

The selection circuit 16 can determine the spectrum mode and the transmission mode of the CDR signal r(n) based on the correlation coefficients from the correlators 14A to 14F. The selection circuit 16 can implement a matrix decision algorithm in accordance with any suitable principles and advantages disclosed herein. The selection circuit 16 can select the transmission mode based on the correlation coefficient with the highest value. The selection circuit 16 can map a binary vector of correlation coefficients of the selected transmission mode to a selected spectrum mode. More details related to an algorithm for determining transmission mode and spectrum mode will be described herein, for example, with reference to FIG. 7. The selection circuit 16 can output the transmission mode and the spectrum mode.

The spectrum mode, the transmission mode, the beacon structure, and correlation for CDR will now be discussed. Then an algorithm to determine spectrum mode and transmission mode from correlation coefficients will be discussed.

FIG. 2 is a table of CDR spectrum modes. The SM describes how a transmitted signal is allocated in the frequency domain. The SM can specify the bandwidth, sub-carrier locations. In certain cases, the SM can specify the in band analog FM location. This information is included in FIG. 2. In FIG. 2, the blocks with dark shading near the sides specify the passband of an analog FM carrier, blocks with diagonal lines near the sides specify frequency blocks for coded OFDM symbols, and the white blocks are unused spectrum. Each block in FIG. 2 is 50 kilohertz (KHz) wide. The frequency blocks can be centered at baseband after the CDR signal is downconverted. A sub-band includes two portions denoted L and U, where L denotes a lower half-sub-band and U denotes an upper half-sub-band. For example, DB3(L) and DB3(U) constitute one sub-band. FIG. 2 shows that there are 6 defined SMs, where SM 1 and SM 2 only support OFDM symbols and SM 9, SM 10, SM 22, and SM 23 support OFDM symbols and In-Band On-Channel (IBOC) analog FM.

The TM defines how the transmitted data is generated and specifies parameters such as one or more of a number of OFDM symbols, code words per frame, CP lengths, OFDM symbol body length, beacon structure, subcarrier frequency spacing, one or more other suitable parameters, or any suitable combination thereof.

Figure 3:
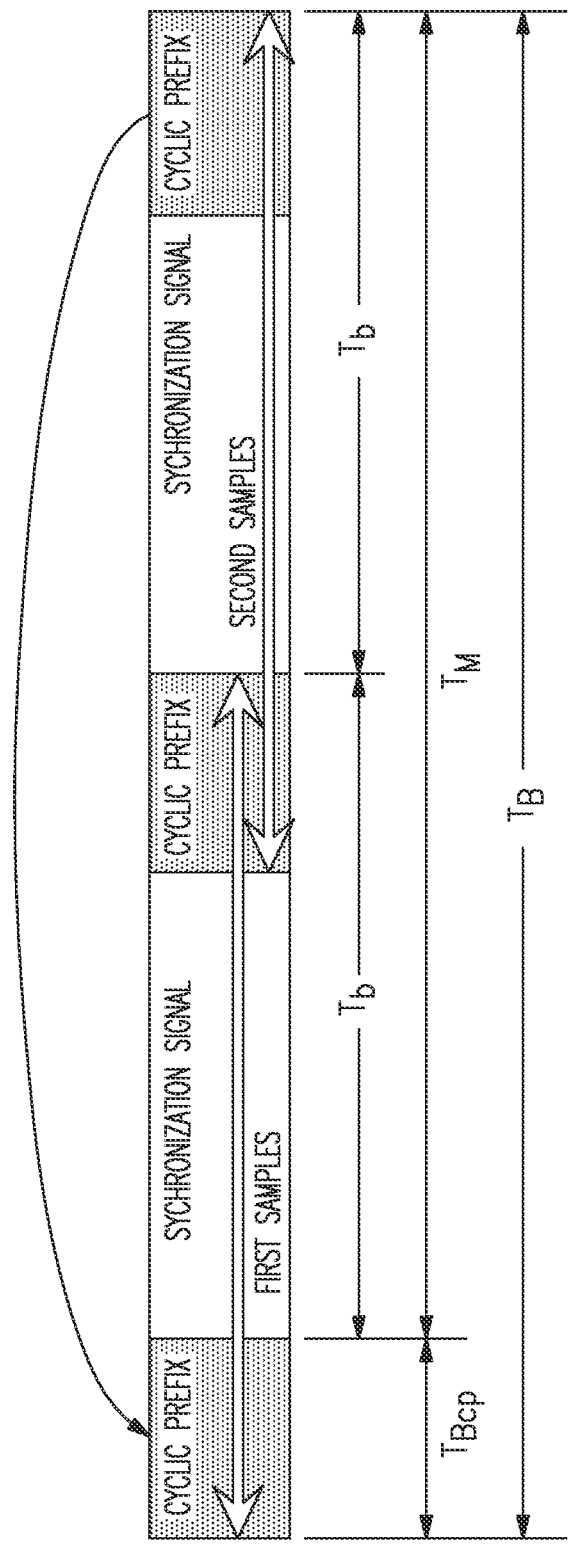
FIG. 3 is a diagram of a beacon structure for CDR.

FIG. 3 is a diagram of a beacon structure for CDR. The illustrated beacon includes a cyclic prefix and two identical synchronization sequences. Each synchronization sequence is a sequence having a length time Tb or a number of samples Nb. The length can be defined in terms of time or a number of samples. Each synchronization sequence can be an Nb point inverse Fast Fourier Transform (IFFT) from a complex sequence and the cyclic prefix can be the last number of cyclic prefix samples Ncp of the synchronization sequence. As shown in FIG. 3, a synchronization sequence can include a synchronization signal followed by a cyclic prefix. The beacon includes a repeating sequence. A filter that passes only part of the beacon can be suitable for determining spectrum mode and transmission mode due to the structure of the beacon.

FIG. 4 is a table of beacon parameters for different transmission modes. The number of samples Nb of the synchronization sequence can be a function of the transmission mode, for example, as shown in FIG. 4. Similarly, the length time Tb of the synchronization sequence can be a function of the transmission mode. Transmission modes 1 and 3 can have the same number of samples and the same length time. Transmission mode 2 can have half of the number of samples compared to transmission modes 1 and 3.

FIG. 5 is a table of beacon cyclic prefix lengths for different transmission modes. The number of cyclic prefix samples can be a function of transmission mode, for example, as shown in FIG. 5. The beacon cyclic prefix length can be different for each CDR transmission mode. Each transmission mode can have a unique combination of CP length and synchronization signal length.

As shown in FIG. 3, the beacon has redundancy where the samples are equivalent to second samples. The first samples include the cyclic prefix and the first synchronization sequence. The second samples include the cyclic prefix at the end of the first synchronization sequence and the second synchronization sequence. To obtain a best correlation, the first samples and second samples can be correlated in accordance with Equation 1. In Equation 1, r(n) is the received discrete baseband OFDM sequence in the time domain.

$$C_B(\tau) = \sum_{n=0}^{N_b+N_{cp}-1} r(n+\tau)r^*(n+\tau+N_b) \qquad (1)$$

Referring back to FIG. 1, an input time domain OFDM sequence r(n) can be filtered by a plurality of independent filters 12A to 12F each having a passband corresponding to a SM. For example, 6 separate filters can filter the input time domain OFDM sequence for 6 SMs. Each filter 12A to 12F has an output that is connected to 3 distinct correlators that are associated with separate TMs.

The correlators of the sets of correlators 14A to 14F are designed for each of the beacon structures defined by the different TMs, for example, in accordance with Equation 1. For example, the set of correlators 14A includes 3 correlators: a correlator for TM 1, a correlator for TM 2, and a correlator for TM 3. The individual correlators can calculate correlation coefficients $\rho i,j$. Each correlation coefficient can each represent a maximum peak over one subframe of samples.

The filters 12A to 12F can partition the correlators into groups or sets 14A to 14F where each group or set represents a particular SM. This grouping provides a level of separation to allow subsequent processing to discriminate between SMs. For example, if coefficients in group j ($\rho j,1$, $\rho j,2$, $\rho j,3$) are appreciably larger in magnitude relative to the others, then possibly the transmitter was configured for SM=j. However, some SMs have intersecting bands that may result in ambiguity. Further processing can be performed to reduce or eliminate the ambiguity.

FIG. 6 is a table of CDR spectrum modes with filter passband and guard bands for the filters 12A to 12F of FIG. 1 according to an embodiment. The discussion of filters and passbands below may refer to both FIG. 1 and FIG. 6. Filter passbands can be centered in a frequency block. There can be a guard band around the passband. In some instances, the guard band can be +/−15 KHz. The filters can have passbands corresponding to the lowest and/or highest frequency blocks for OFDM symbols for a spectrum mode.

The first filter 12A can correspond to SM 1. The passband of the first filter 12A can be centered in the sub-bands for frequency blocks −1 and 1 in FIG. 6. The second filter 12B can correspond to SM 2. The passband of the second filter 12B can be centered in the sub-bands for frequency blocks −2 and 2 in FIG. 6. The third filter 12C can correspond to SM 9. The passband of the third filter 12C can be centered in the sub-bands for frequency blocks −4 and 4 in FIG. 6. The fourth filter 12D can correspond to SM 10. The passband of fourth filter 12D can be centered in the sub-bands for frequency blocks −5 and 5 in FIG. 6. The fifth filter 12E can correspond to SM 22. The passband of the fifth filter 12E can be centered in the sub-bands for frequency blocks −3 and 3 in FIG. 6. The sixth filter 12F can correspond to SM 23. The passband of the sixth filter 12F can be centered in the sub-bands for frequency blocks −4 and 4 in FIG. 6.

Two different filters of the processing circuitry 10 can have passbands that are generally the same as each other, even though the two filters correspond to different spectrum modes. For example, as shown in FIG. 6, the filters 3 and 6 (e.g., the third filter 12C and the sixth filter 12F of FIG. 1) can have passbands for frequency blocks −4 and 4. These passbands overlap with each other. Moreover, these passbands are generally the same as each other.

In certain SMs, OFDM symbols are within a passband of a single filter of the filters 12A to 12F. For example, in SM 1, OFDM symbols are only within the passband of filter 12A. Accordingly, for SM 1, the correlation coefficients generated by the set of correlators 14A should have a significantly higher value that the correlation coefficients generated by the other sets of correlators 14B to 14F. As another example, in SM 22, OFDM symbols are only within the passband of filter 12E.

More than one SM can have OFDM symbols in the same frequency block. For example, as shown in FIG. 6, SMs 9, 10, and 23 have OFDM symbols in frequency blocks −4 and 4. As another example, as shown in FIG. 6, SMs 22 and 23 have OFDM symbols in frequency blocks −3 and 3. As one more example, as shown in FIG. 6, SMs 1 and 2 have OFDM symbols in frequency blocks −1 and 1. FIG. 6 indicates that four filters 12A, 12C, 12E, and 12F of the processing circuitry 10 can each have a respective passband that corresponds to frequencies of OFDM symbols for a plurality of spectrum modes. The selection circuit 16 of FIG. 1 can implement a decision matrix algorithm to resolve ambiguity associated with OFDM symbols from different SMs being in the same frequency blocks to select the combination of SM and TM with the highest probability based on the correlation coefficients generated by correlators of the sets of correlators 14A to 14F.

Although embodiments disclosed herein may be discussed with reference to 6 filters and 18 correlation coefficients for determining transmission mode and spectrum mode for CDR, transmission mode and spectrum mode can be determined for CDR using a different number of filters and/or a different number of correlation coefficients. For example, FIG. 6 indicates that the third filter 12C and the sixth filter 12F can have the same passband. The correlation coefficients generated from output signals from filters 14C and 14F can be the same. Spectrum mode and transmission mode can be determined with only one of these filters and the corresponding correlation coefficients. Thus, in some applications, spectrum mode and transmission mode for CDR can be determined from 18 possible combinations using 15 correlation coefficients generated from output signals from 5 filters. The matrix selection algorithm can be applied to these 15 correlation coefficients in accordance with any suitable principles and advantages disclosed herein.

Figure 7:
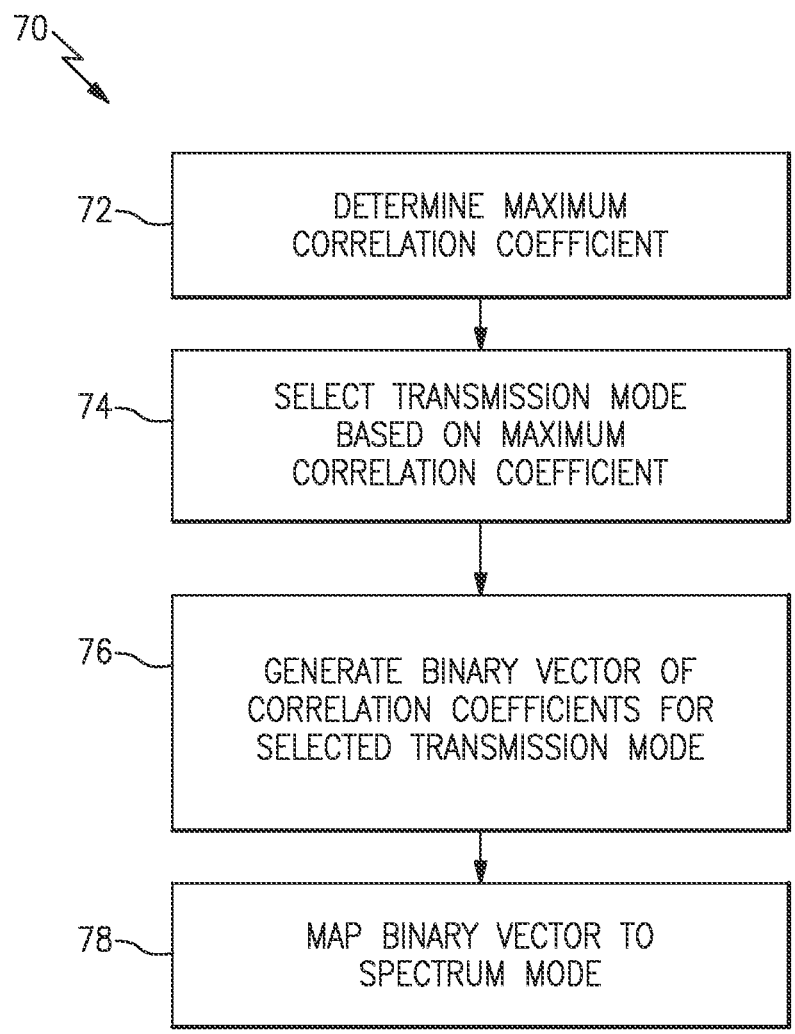
FIG. 7 is a flow diagram for a method of selecting transmission mode and spectrum mode from correlation coefficients according to an embodiment.

FIG. 7 is a flow diagram for a method 70 of selecting transmission mode and spectrum mode from correlation coefficients according to an embodiment. The method 70 can involve applying a matrix decision algorithm to select transmission mode and spectrum mode. The method 70 can be performed in an amount of time corresponding to analyzing one configuration of spectrum mode and transmission mode. The method 70 can scale as the number of combinations of spectrum mode and transmission mode increases. The method 70 can be performed using selection circuit 16 of the processing circuitry 10 of FIG. 1, for example. For illustrative purposes, the following description may refer to circuitry of FIG. 1. It will be understood that the principles and advantages of the method 70 can be applied to other circuitry that is suitable for determining spectrum mode and transmission mode.

At block 72, the maximum correlation coefficient can be determined. A correlation coefficient for different combinations of transmission mode and spectrum mode can be generated. Such correlation coefficients can each correspond to a transmission mode and at least one spectrum mode. For example, a correlation coefficient for each combination of spectrum mode and transmission mode can be generated. These correlation coefficients can be provided to the selection circuit 16. For example, 18 correlation coefficients can be provided to the selection circuit 16 in the processing circuitry 10 of FIG. 1. In some other applications, 15 correlation coefficients can be provided to the section circuit 16 for determining spectrum mode and transmission mode from 18 combinations of spectrum mode and transmission mode. In this case, one filter of five filters can correspond to two spectrum modes, 3 correlation coefficients can be generated from an output each of the five filters, and transmission mode and spectrum mode can be determined from the 15 correlation coefficients. The selection circuit 16 can determine a maximum correlation coefficient $\rho max$.

The correlation coefficients can be stored in a matrix. Equation 2 show an example matrix with correlation coefficients, where $\rho max = \max[\rho 1,1, \rho 1, 2, \ldots, \rho 6,3]$ and the row space corresponds to spectrum mode and the column space corresponds to transmission mode. This matrix corresponds to the correlation coefficients generated by the sets of correlators 14A to 14F in FIG. 1.

$$R = \frac{1}{\rho_{max}} \begin{bmatrix} \rho_{1,1} & \rho_{1,2} & \rho_{1,3} \\ \rho_{2,1} & \rho_{2,2} & \rho_{2,3} \\ \rho_{3,1} & \rho_{3,2} & \rho_{3,3} \\ \rho_{4,1} & \rho_{4,2} & \rho_{4,3} \\ \rho_{5,1} & \rho_{5,2} & \rho_{5,3} \\ \rho_{6,1} & \rho_{6,2} & \rho_{6,3} \end{bmatrix} \begin{matrix} SM\ 1 \\ SM\ 2 \\ SM\ 9 \\ SM\ 10 \\ SM\ 22 \\ SM\ 23 \end{matrix} \quad TM\ 1\ TM\ 2\ TM\ 3 \quad (2)$$

The transmission mode can be selected based on the maximum correlation coefficient at block 74. The selected transmission mode TMopt can be selected based on Equation 3:

$$(i, j) = \arg\left(\max_{i,j}(R_{i,j})\right) \quad (3)$$
$$TM_{opt} = j$$

Spectrum mode estimation can be more complex considering that the CDR specification supports two signal bandwidths for OFDM symbols, 100 KHz and 200 KHz, and there are spectral intersections between spectrum modes. For example, a transmitter can be configured with SM 2 and TM 1 where the signal bandwidth is 200 KHz. In this example, the first and second filters 12A and 12B can pass the signal and the filters 12C, 12D, 12E, and 12F can reject the signal. For moderate signal-to-noise ratio (SNR), one can expect $R1,1 \approx 1\ R2,1 \approx 1$ and the other elements to be small ($<<1$) in Equation 2. In this case, the maximum correlation coefficient $\rho max$ can occur in column 1 and j=1. Accordingly, in block 74, transmission mode 1 can be selected.

At block 76, a binary vector of correlation coefficients can be generated for the selected transmission mode. The binary vector includes a sequence of binary values. The binary vector can have a number of bits corresponding to a number of filters used in generating correlation coefficients. In certain applications, the binary vector can have a number of bits corresponding to the number of spectrum modes. For example, for CDR with 6 spectrum modes, the binary vector can be a 6-bit vector in certain applications. A binary vector V=(v6, v5, . . . , v1) can be created as follows: v(n)=1 if $R_{n,j} \geq 0.75$ for n=[1, . . . , 6], otherwise v(n)=0, where the most significant bit (MSB) is v(6). Accordingly, normalized correlation coefficients for the selected transmission mode that satisfy (e.g., are greater than or equal to) a threshold can be assigned 1 in the binary vector and other normalized correlation coefficients for the selected transmission mode that do not satisfy (e.g., are less than) the threshold can be assigned 0 in the binary vector. While 0.75 is provided as an example threshold, any other suitable threshold can be used. Also, correlation coefficients need not be normalized to have values between 0 and 1 for the binary vector to be formed and a different threshold can be selected. In some applications, for CDR with 6 spectrum modes, the binary vector can be a 5-bit vector where one of filter 12C or filter 12F is implemented.

The binary vector can be mapped to a spectrum mode at block 78. In the example with SM 2 and TM 1, the vector for the row for selected transmission mode 1 is V=000011, which is V=3 in integer notation. Thus, if V=3, then we conclude SM=2. The vector can map to the optimal spectrum mode as shown in Table 1 below, where the vector values are included in integer notation.

TABLE 1

Mapping of Vector to Spectrum Mode

| Vector Value | 1 | 3 | 36 | 44 | 16 | 52 |
|---|---|---|---|---|---|---|
| SM | 1 | 2 | 9 | 10 | 22 | 23 |

The mapping in Table 1 reflects that several spectrum modes can receive OFDM symbols within passbands of filters for other spectrum modes, where the passbands are indicated in FIG. 6.

For SM 1, OFDM symbols are only within the passband of the filter for SM 1. Thus, the binary vector is likely to have an integer value of 1 for SM 1.

For SM 2, OFDM symbols are within the passbands of the filters for SMs 1 and 2. Thus, the binary vector is likely to have an integer value of 3 for SM 2.

For SM 9, OFDM symbols are within the passbands of the filters for SMs 9 and 23. Thus, the binary vector is likely to have an integer value of 36 for SM 9.

For SM 10, OFDM symbols are within the passbands of the filters for SMs 9, 10, and 23. Thus, the binary vector is likely to have an integer value of 44 for SM 10.

For SM 22, OFDM symbols are only within the passband of the filter for SM 22. Thus, the binary vector is likely to have an integer value of 16 for SM 22.

For SM 23, OFDM symbols are within the passbands of the filters for SMs 9, 22, and 23. Thus, the binary vector is likely to have an integer value of 52 for SM 23.

In some instances, the binary vector may not match to a spectrum mode according to the mapping of Table 1. In such instances, the spectrum mode can be selected based on the maximum correlation coefficient. The selected spectrum mode can be the spectrum mode associated with the maximum correlation coefficient in these instances. This can be the row of the maxim correlation coefficient for the matrix of Equation 2. The selected spectrum mode SMopt can be selected based on Equation 4:

$$(i, j) = \arg\left(\max_{i,j}(R_{i,j})\right) \quad (4)$$

$$SM_{opt} = i$$

After the spectrum mode and transmission mode are selected, a radio system can be configured for receiving a CDR signal in the selected spectrum mode and the selected transmission mode. For example, a downconverter and/or one or more filters can be adjusted for the selected spectrum mode. As another example, decoding and/or digital demodulation of a CDR signal can be adjusted for the selected transmission mode.

Figure 8:
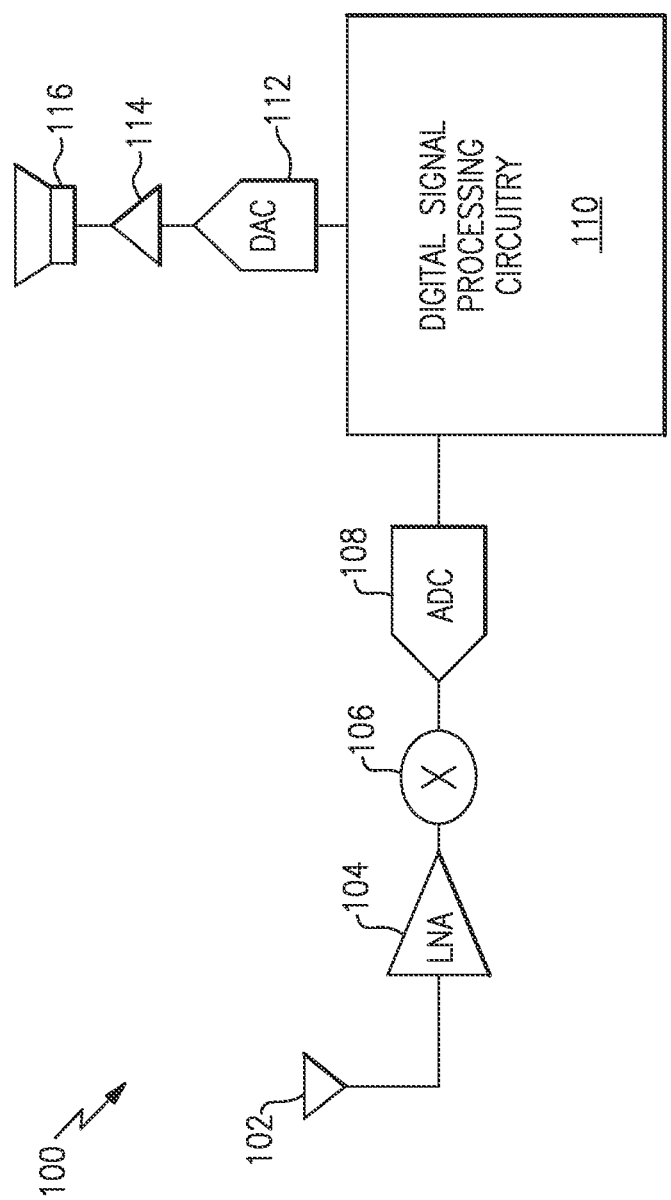
FIG. 8 is a schematic diagram of an example radio system according to an embodiment.

FIG. 8 is a schematic diagram of an example radio system 100 according to an embodiment. The radio system 100 can receive and process a digital radio signal. The radio system 100 can generate audio from the digital radio signal. The radio system 100 can process a digital radio signal can be in accordance one or more suitable digital radio standards, such as one or more of National Radio System Committee (NRSC-5C, also known as HD TM radio), Digital Audio Broadcasting (DAB), Digital Radio Mondiale (DRM), CDR, or another digital radio standard. As illustrated, the radio system 100 includes an antenna 102, a low noise amplifier (LNA) 104, a mixer 106, an analog-to-digital converter (ADC) 108, digital signal processing circuitry 110, a digital-to-analog converter (DAC) 112, an amplifier 114, and a speaker 116.

The radio system 100 is an example system that can process a received CDR signal in accordance with any suitable principles and advantages disclosed herein. The digital signal processing circuitry 110 can generate correlation coefficients each associated with a transmission mode and at least one spectrum mode. The digital signal processing circuitry 110 can determine the transmission mode and spectrum mode of the received CDR signal based on the correlation coefficients. The digital signal processing circuitry 110 can determine the transmission mode and the spectrum mode of a CDR signal using time domain processing. The radio system 100 can be configured for receiving the CDR signal in the determined transmission mode and spectrum mode.

With reference to the radio system 100 of FIG. 8, a radio frequency signal that includes digital radio signals according to a given digital broadcast specification can be received via the antenna 102. In some instances, the radio frequency signal can be received via two or more antennas.

A radio frequency signal received via the antenna 102 can be processed by a receive signal path and provided to the digital signal processing circuitry 110. The radio frequency signal path includes at least an LNA 104, a mixer 106, and an ADC 108. In some instances, the radio frequency signal path can include additional circuit elements, such as one or more filters, one or more amplifiers with automatic gain control, etc. A radio frequency signal received via antenna 102 can be amplified by the LNA 104. The amplified RF signal can be downconverted by the mixer 106. The downconverted signal generated by the mixer 106 can be a low-intermediate frequency (IF) or zero-IF signal, for example. The downconverted signal can include an in-phase/quadrature phase (IQ) signal. The ADC 108 can digitize the downconverted signal into a digital signal.

The digital signal processing circuitry 110 can perform any suitable processing on the digitized signal provided by the ADC 108. For example, the digital signal processing circuitry 110 can perform processing described with reference to FIG. 9 and/or FIG. 10. The digital signal processing circuitry 110 can select a spectrum mode and a transmission mode in accordance with any suitable principles and advantages disclosed herein. The digital signal processing circuitry 110 can generate an audio output signal.

The audio output signal can be converted from a digital signal to an analog signal by a digital-to-analog converted (DAC) 112. The analog audio signal can be amplified by amplifier 114. The amplified analog audio signal can be provided to a speaker 116. The speaker 116 can output audio. While one speaker is shown in FIG. 8, audio can be output from any suitable number of speakers based on one or more audio signals provided by the digital signal processing circuitry 110.

Figure 9:
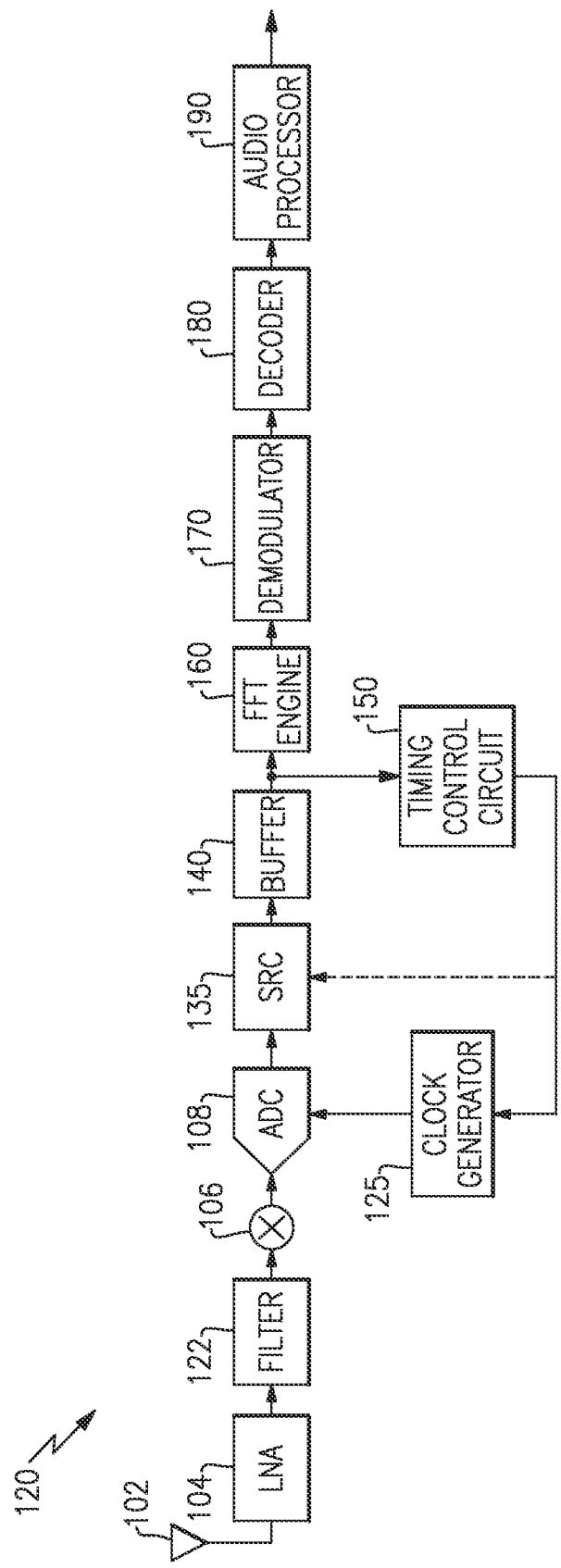
FIG. 9 is a schematic diagram of a receiver according to an embodiment.

FIG. 9 shows an example of a receiver 120 that incorporates transmission mode and spectrum mode selection in accordance with any suitable principles and advantages disclosed herein. In some embodiments, receiver 120 can be embodied in a single-die integrated circuit, such as a complementary metal oxide semiconductor (CMOS) die having mixed signal circuitry including both analog and digital circuitry. According to some other embodiments, the receiver 120 can be implemented by two or more semiconductor dies.

As illustrated, the receiver 120 includes an antenna 102, an LNA 104, a filter 122, a mixer 106, an ADC 108, a clock generator 125, a sample rate converter (SRC) 135, a buffer 140, a timing control circuit 150, a fast Fourier transform (FFT) engine 160, a demodulator 170, a decoder 180, and an audio processor 190. The SRC 135, the buffer 140, the FFT engine 160, the demodulator 170, the decoder 180, and the audio processor 190 can be included in the digital signal processing circuitry 110 of FIG. 8. The timing control circuit 150 can generate correlation coefficients and determine the transmission mode and spectrum mode of a received CDR signal based on the correlation coefficients in accordance with any suitable principles and advantages disclosed herein. The receiver 120 can be configured for receiving the CDR signal in the determined transmission mode and spectrum mode.

A radio frequency signal is received at the antenna 102. The LNA 104 amplifies the radio frequency signal. The filter 122 filters the amplified radio frequency signal provided by the LNA 104. The LNA 104 and the filter 122 can be considered radio frequency front end blocks. In certain applications, the receiver 120 can include additional radio frequency circuitry (not illustrated in FIG. 9). The mixer 106 can downconvert the filtered radio frequency signal provided by the filter 122 to a lower frequency signal. In certain applications, this lower frequency signal can a low-IF or zero-IF signal. The downconverted signal can be an IQ signal.

The ADC 108 can digitize the downconverted signal into a digital signal at a sampling rate based on a clock signal received from a clock generator 125. The clock generator 125 can be implemented as a local oscillator, phase lock loop, or another suitable clock generation circuit. In some applications, the sampling clock signal and a mixing signal provided to the mixer 106 are at the same frequency and the clock generator 125 can also provide the mixing signal to mixer 106. In certain applications, either before or after digitization, channelization may be performed to generate a channelized signal. In an OFDM system, a plurality of samples can form an OFDM symbol of an incoming data stream.

The SRC 135 can receive the digitized signals from the ADC 108. The SRC 135 can be an asynchronous or arbitrary sample rate converter that receives incoming digitized samples at an arbitrary frequency, resamples the samples, and outputs the samples according to a fixed frequency. The arbitrary frequency can be under microcontroller control, for example. The fixed frequency can be a virtual frequency at which downstream processing components operate, for example. In some applications, SRC 135 implements a Farrow variable digital filter structure with coefficients varied based on of a control variable. Any other suitable SRC 135 can be implemented.

The SRC 135 provides the resampled samples to the buffer 140. The buffer 140 can be a first in first out (FIFO) buffer. The incoming samples stored in buffer 140 and can then be output to a main digital signal processing path including the FFT engine 160. The FFT engine 160 can generate frequency domain OFDM symbols from incoming time domain OFDM symbols. In certain applications, each incoming time domain OFDM symbol can be processed by FFT engine 160 into a plurality of sub-carriers. The number of sub-carriers corresponding to a given OFDM symbol can vary depending on bandwidth of signal and a time duration of the OFDM symbol (without a cyclic prefix).

The incoming time domain OFDM symbols stored in buffer 140 can also be provided to the timing control circuit 150. The timing control circuit 150 can perform timing estimation to determine a synchronization of the OFDM symbols. Accordingly, the OFDM symbols can be provided to downstream digital processing circuitry in correct synchronization. The timing control circuit 150 can compensate for symbol timing offset and/or sample rate offset. The timing control circuit 150 can provide a control signal to the clock generator 125 to adjust a clock signal provided to the ADC 108. Alternatively or additionally, the timing control circuit 150 can adjust the SRC 135. The timing control circuit 150 can perform filtering, generate correlation coefficients, and determine spectrum mode and transmission mode in accordance with any suitable principles and advantages disclosed herein. The timing control circuit 150 can configure the receiver 120 for operating in the spectrum mode and the transmission mode by providing one or more control signals to other circuitry of the receiver 120.

The sub-carrier outputs from FFT engine 160 can form a frequency domain symbol that is provided to the demodulator 170. The demodulator 170 can demodulate the sub-carrier outputs from the FFT engine 160 and provide demodulated sub-carriers. The demodulator 170 can be a sub-symbol decoder to produce soft information per sub-carrier. The decoder can decode the demodulated sub-carriers from the demodulator 170. The decoder 180 can perform correction and/or information bit extraction. The output signal from the decoder 180 can be processed by the audio processor 190. The audio processor 190 can perform any suitable audio processing. The audio processor 190 can generate an encoded audio signal that is decoded in downstream circuitry (not illustrated in FIG. 9) to generate source audio. In the case of a data link, information bits may be provided to a data processor. Although shown as individual components, portions of the receiver 120 after ADC 108 to the end of the signal processing path of FIG. 9 can be implemented in a digital signal processor (DSP).

Other implementations are possible, and additional circuitry can be present. For example, in certain applications, additional circuitry can be implemented. In addition, filters, correlators, and/or mode selection circuitry may be configured in other types of hardware, may be realized via combinations of hardware, firmware, and/or software, and also may be implemented within a microcontroller or DSP.

Figure 10:
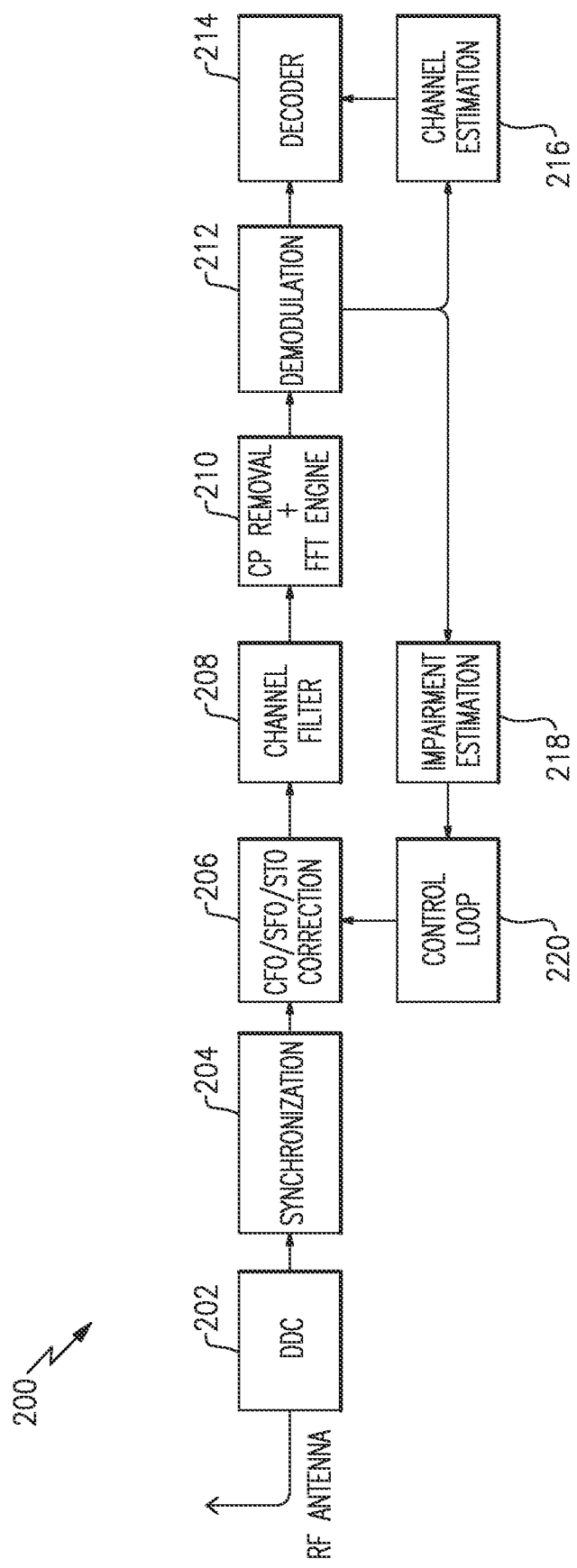
FIG. 10 is a schematic block diagram of a baseband orthogonal frequency division multiplexing receiver according to an embodiment.

FIG. 10 is a schematic block diagram of a baseband OFDM receiver 200 according to an embodiment. As illustrated, baseband OFDM receiver 200 includes a digital downconverter 202, a synchronization circuit 204, a correction circuit 206, a channel filter 208, a cyclic prefix removal and FFT engine 210, a demodulator 212, a decoder 214, a channel estimation circuit 216, an impairment estimation circuit 218, and a control loop 220. The baseband OFDM receiver 200 can process OFDM signals. The digital downconverter 202 can convert a radio frequency signal to baseband signal. The synchronization circuit 204 can perform any suitable synchronization functionality. Circuitry for determining spectrum mode and transmission mode, such as the processing circuitry 10 of FIG. 1, can be implemented in the synchronization circuit 204. Such circuitry for determining spectrum mode and transmission mode can process time domain OFDM symbols. The correction circuit 206 can implement one or more of carrier frequency offset compensation (CFO), symbol timing offset (STO) compensation, or sample rate offset (SRO) compensation. The channel filter 208 can provide channel filtering. The cyclic prefix removal and FFT engine 210 can remove the cyclic prefix from a symbol and perform an FFT on time domain OFDM symbols to generate frequency domain OFDM symbols. The demodulator 212 can demodulate the frequency domain OFDM symbols. The decoder 214 can decode the demodulated OFDM symbols based on an output from the channel estimation circuit 216. The impairment estimation circuit 218 and the control loop 220 can provide an input for the correction circuit 206 to compensate for one or more of CFO, SFO, or STO.

Any of the embodiments described above can be implemented in radio systems. The principles and advantages of the embodiments can be used for any systems or apparatus, such as any radio receiver, that could benefit from any of the embodiments described herein. The teachings herein are applicable to a variety of systems. In certain applications, radio systems disclosed herein are implemented in vehicles such as automobiles. Although this disclosure includes some example embodiments, the teachings described herein can be applied to a variety of structures.

Aspects of this disclosure can be implemented in various electronic devices. Examples of the electronic devices can include, but are not limited to, consumer electronic products, parts of the consumer electronic products, radio receivers, wireless communication infrastructure, electronic test equipment, etc. Examples of the electronic devices can include, but are not limited to, a stereo system, a digital music player, a radio, a vehicular electronics system such as an automotive electronics system, etc. Further, the electronic devices can include unfinished products.

Unless the context indicates otherwise, throughout the description and the claims, the words "comprise," "comprising," "include," "including" and the like are to generally be construed in an inclusive sense, as opposed to an exclusive or exhaustive sense; that is to say, in the sense of "including, but not limited to." Conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively.

While certain embodiments have been described, these embodiments have been presented by way of example only, and are not intended to limit the scope of the disclosure. Indeed, the methods, systems, and circuits described herein may be embodied in a variety of other forms. Furthermore, various omissions, substitutions, and changes in the form of the methods, systems, and circuits described herein may be made without departing from the spirit of the disclosure. Any suitable combination of the elements and/or acts of the various embodiments described above can be combined to provide further embodiments. The accompanying claims and their equivalents are intended to cover such forms or modifications as would fall within the scope and spirit of the disclosure.

What is claimed is:

1. Digital signal processing circuitry comprising:
   a plurality of filters each having a passband corresponding to at least one spectrum mode;
   a group of correlators each configured to generate a correlation coefficient for a particular transmission mode and at least one particular spectrum mode; and
   a selection circuit configured to select a transmission mode of a Convergent Digital Radio signal based on the correlation coefficients from the group of correlators and to map the correlation coefficients from the group of correlators to a spectrum mode of the Convergent Digital Radio signal.

2. The digital signal processing circuitry of claim 1 wherein the selection circuit is configured to generate a binary vector of correlation coefficients for the transmission mode, and to use the binary vector to map the correlation coefficients to the spectrum mode.

3. The digital signal processing circuitry of claim 1 wherein the selection circuit is configured to determine a maximum correlation coefficient having a maximum value of the correlation coefficients from the group of correlators, the maximum correlation coefficient corresponding to the transmission mode.

4. The digital signal processing circuitry of claim 1 wherein the plurality of filters includes at least 5 filters.

5. The digital signal processing circuitry of claim 1 wherein 3 correlators from the group of correlators are connected to an output of each filter of the plurality of filters.

6. The digital signal processing circuitry of claim 1 wherein at least one of the correlation coefficients corresponds to two spectrum modes.

7. The digital signal processing circuitry of claim 1 wherein the plurality of filters includes at least 3 filters having respective passbands that correspond to frequencies of Orthogonal Frequency Division Multiplexing symbols for a plurality of spectrum modes.

8. The digital signal processing circuitry of claim 1 wherein the group of correlators are configured to generate at least 15 correlation coefficients.

9. A radio system for determining transmission mode and spectrum mode of Convergent Digital Radio, the radio system comprising:
one or more antennas;
a receive signal path operatively connected to the one or more antennas; and
digital signal processing circuitry in communication with the receive signal path, the digital signal processing circuitry configured to implement a plurality of filters each having a passband corresponding to at least one spectrum mode, a group of correlators each configured to generate a correlation coefficient for a particular transmission mode and at least one particular spectrum mode, and a selection circuit configured to select a transmission mode of a Convergent Digital Radio signal received by the one or more antennas based on the correlation coefficients from the group of correlators and to map the correlation coefficients from the group of correlators to a spectrum mode of the Convergent Digital Radio signal.

10. The radio system of claim 9 wherein the digital signal processing circuitry is arranged to configure the radio system to receive the Convergent Digital Radio signal in the transmission mode and the spectrum mode based on selecting the transmission mode and the spectrum mode.

11. The radio system of claim 9 wherein the selection circuit is configured to determine a maximum correlation coefficient having a maximum value of the correlation coefficients from the group of correlators, the maximum correlation coefficient corresponding to the transmission mode.

12. The radio system of claim 11 wherein the selection circuit is configured to generate a binary vector of correlation coefficients for the transmission mode, and to use the binary vector to map the correlation coefficients to the spectrum mode.

13. The radio system of claim 9 further comprising a speaker in communication with the digital signal processing circuitry.

14. The radio system of claim 9 wherein the digital signal processing circuitry is configured to select the transmission mode and the spectrum mode from time domain Orthogonal Frequency Division Multiplexing symbols using time domain processing.

15. A method of determining spectrum mode and transmission mode for Convergent Digital Radio, the method comprising:
filtering a Convergent Digital Radio signal to generate a plurality of filtered signals;
generating a group of correlation coefficients from the plurality of filtered signals, each correlation coefficient of the group of correlation coefficients corresponding to a particular transmission mode and at least one particular spectrum mode;
selecting a transmission mode of the Convergent Digital Radio signal based on the group of correlation coefficients; and
determining a spectrum mode of the Convergent Digital Radio signal based on mapping the group of correlation coefficients to the spectrum mode.

16. The method of claim 15 further comprising configuring a radio system to receive a Convergent Digital Radio transmission in the transmission mode and the spectrum mode.

17. The method of claim 15 wherein the selecting the transmission mode includes determining a maximum correlation coefficient having a maximum value of the correlation coefficients of the group, and the maximum correlation coefficient corresponds to the transmission mode.

18. The method of claim 15 wherein the determining the spectrum mode includes generating a binary vector of correlation coefficients for the transmission mode, and using the binary vector to map the group of correlation coefficients to the spectrum mode.

19. The method of claim 18 wherein the mapping is based on a set of the plurality of filtered signals having frequencies corresponding to Orthogonal Frequency Division Multiplexing symbols in the spectrum mode.

20. The method of claim 15 wherein the method is performed on a time domain Orthogonal Frequency Division Multiplexing sequence of the Convergent Digital Radio signal, and the filtering, the generating, and the selecting are performed in the time domain.

* * * * *